(12) United States Patent
Kolingivadi et al.

(10) Patent No.: US 8,307,438 B2
(45) Date of Patent: *Nov. 6, 2012

(54) SYSTEM, METHOD, AND COMPUTER PROGRAM PRODUCT FOR CONDITIONALLY PERFORMING A SCAN ON DATA BASED ON AN ASSOCIATED DATA STRUCTURE

(75) Inventors: Deepakeswaran Kolingivadi, Bangalore (IN); Muthu Nivas Haribarasubramanian, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/303,072

(22) Filed: Nov. 22, 2011

(65) Prior Publication Data

US 2012/0069400 A1 Mar. 22, 2012

Related U.S. Application Data

(63) Continuation of application No. 11/873,177, filed on Oct. 16, 2007, now Pat. No. 8,082,584.

(51) Int. Cl.
*H04L 29/06* (2006.01)
(52) U.S. Cl. ............... 726/22; 726/23; 726/24; 713/188
(58) Field of Classification Search .................. None
See application file for complete search history.

(56) References Cited

U.S. PATENT DOCUMENTS

| | | | |
|---|---|---|---|
| 5,537,642 A * | 7/1996 | Glowny et al. .................. 726/2 |
| 5,696,822 A * | 12/1997 | Nachenberg .................... 726/24 |
| 5,978,475 A * | 11/1999 | Schneier et al. ............... 713/177 |
| 6,499,104 B1 * | 12/2002 | Joux ............................. 713/176 |
| 6,735,700 B1 * | 5/2004 | Flint et al. ........................ 726/24 |
| 6,802,012 B1 * | 10/2004 | Smithson et al. ............... 726/24 |
| 6,981,280 B2 * | 12/2005 | Grupe ............................. 726/22 |
| 7,065,790 B1 * | 6/2006 | Gryaznov ....................... 726/24 |
| 7,334,263 B2 * | 2/2008 | Szor ............................... 726/22 |
| 7,644,352 B2 * | 1/2010 | Grupe ........................... 715/234 |
| 7,765,410 B2 * | 7/2010 | Costea et al. .................. 713/188 |
| 7,774,413 B2 * | 8/2010 | Costea et al. .................. 709/206 |
| 2002/0147780 A1 | 10/2002 | Liu et al. |
| 2003/0041259 A1 * | 2/2003 | Vignoles et al. .............. 713/200 |
| 2003/0131249 A1 * | 7/2003 | Hoffman ........................ 713/188 |
| 2004/0215977 A1 * | 10/2004 | Goodman et al. ............. 713/201 |
| 2006/0075499 A1 * | 4/2006 | Edwards et al. ................ 726/24 |
| 2006/0095966 A1 * | 5/2006 | Park ................................ 726/22 |
| 2006/0185017 A1 * | 8/2006 | Challener et al. ............... 726/24 |
| 2007/0050444 A1 * | 3/2007 | Costea et al. .................. 709/202 |
| 2009/0064335 A1 * | 3/2009 | Sinn et al. ....................... 726/24 |

OTHER PUBLICATIONS

Forefront Security for Exchange Server 2007 User Guide, Microsoft Corporation, 2007.

* cited by examiner

*Primary Examiner* — Ponnoreay Pich
(74) *Attorney, Agent, or Firm* — Patent Capitol Group (57) ABSTRACT

A system, method, and computer program product are provided for conditionally performing a scan of data based nit an associated data structure. In use, at least one aspect is identified for each of a first plurality of scanners utilized to perform a scan on data at a first network device. Additionally, at least one data structure is associated with the data, where the at least one data structure reflects the at least one aspect of each of the first plurality of scanners. Furthermore, a subsequent scan on the data is conditionally performed utilizing, each of a second plurality of scanners at a second network device, based on the at least one data structure.

20 Claims, 6 Drawing Sheets

SYSTEM, METHOD, AND COMPUTER PROGRAM PRODUCT FOR CONDITIONALLY PERFORMING A SCAN ON DATA BASED ON AN ASSOCIATED DATA STRUCTURE

CROSS-REFERENCE TO RELATED APPLICATIONS

This application is a continuation (and claims the benefit of priority under 35 U.S.C. §120) of U.S. patent application Ser. No. 11/873,177, filed Oct. 16, 2007 now U.S. Pat. No. 8,082,584, and entitled, "SYSTEM, METHOD, AND COMPUTER PROGRAM PRODUCT FOR CONDITIONALLY PERFORMING A SCAN ON DATA BASED ON AN ASSOCIATED DATA STRUCTURE". The disclosure of the prior application is considered part of (and is incorporated herein by reference) the disclosure of this application.

FIELD OF THE INVENTION

The present invention relates to scanning data, and more particularly to scanning data at network devices.

BACKGROUND

Security systems have traditionally been utilized for detecting unwanted data (e.g. viruses, malware, etc.). Such detection has become increasingly important in traditional business environments, where unwanted data has expanded beyond virus attacks to include the sending of obscene banned content in electronic mail messages, the abuse of network bandwidth by sharing media files, etc. Thus, the security systems have often been employed in networks for detecting unwanted data in such networks. For example, such detection has sometimes been achieved by scanning data for known unwanted data. However, the security systems have exhibited various limitations when multiple security systems are employed for scanning data.

For example, some traditional security systems scan data received over a network only if a version associated with the security system (e.g. a version of known unwanted data, a version of the engine utilized by the security system, etc.) differs from a version associated with another security system that previously scanned the data. This may be accomplished by using a stamp or the like that identifies such version information. Such security systems may also fail to scan received data if the stamp associated with the data indicates the data has been previously scanned, without performing a validation of the stamp. These traditional security systems may thus lead to a failure in detecting unwanted data.

Still yet, other traditional security systems scan all received data, regardless of whether the data has been previously scanned. However, this customarily results in performance degradation with respect to the network. There is thus a need for addressing these and/or other issues associated with the prior art.

SUMMARY

A system, method, and computer program product are provided for conditionally performing a scan of data based on an associated data structure. In use, at least one aspect is identified for each of a first plurality of scanners utilized to perform a scan on data at a first network device. Additionally, at least one data structure is associated with the data, where the at least one data structure reflects the at least one aspect of each of the first plurality of scanners. Furthermore, a subsequent scan on the data is conditionally performed utilizing each of a second plurality of scanners at a second network device, based on the at least one data structure.

DETAILED DESCRIPTION

Figure 1:
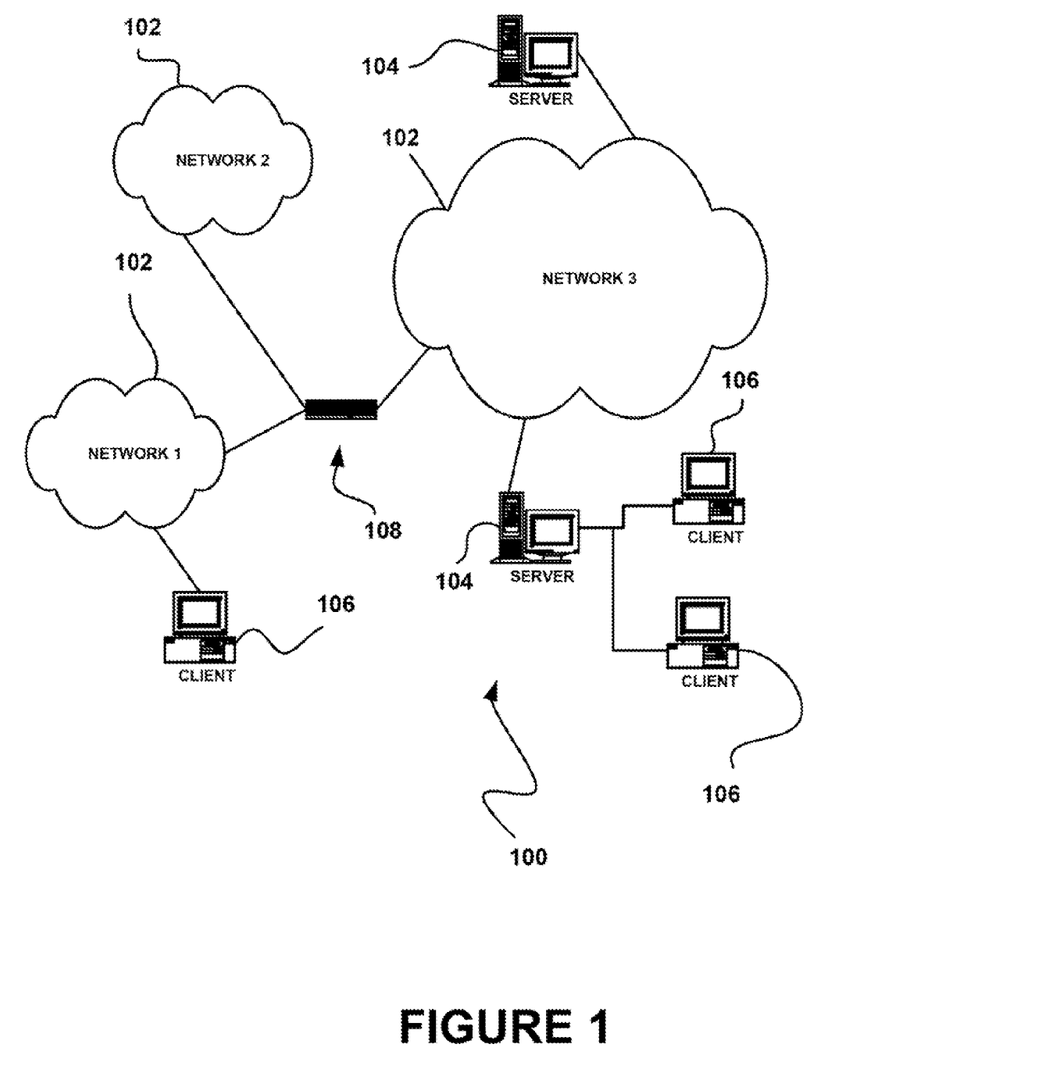
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
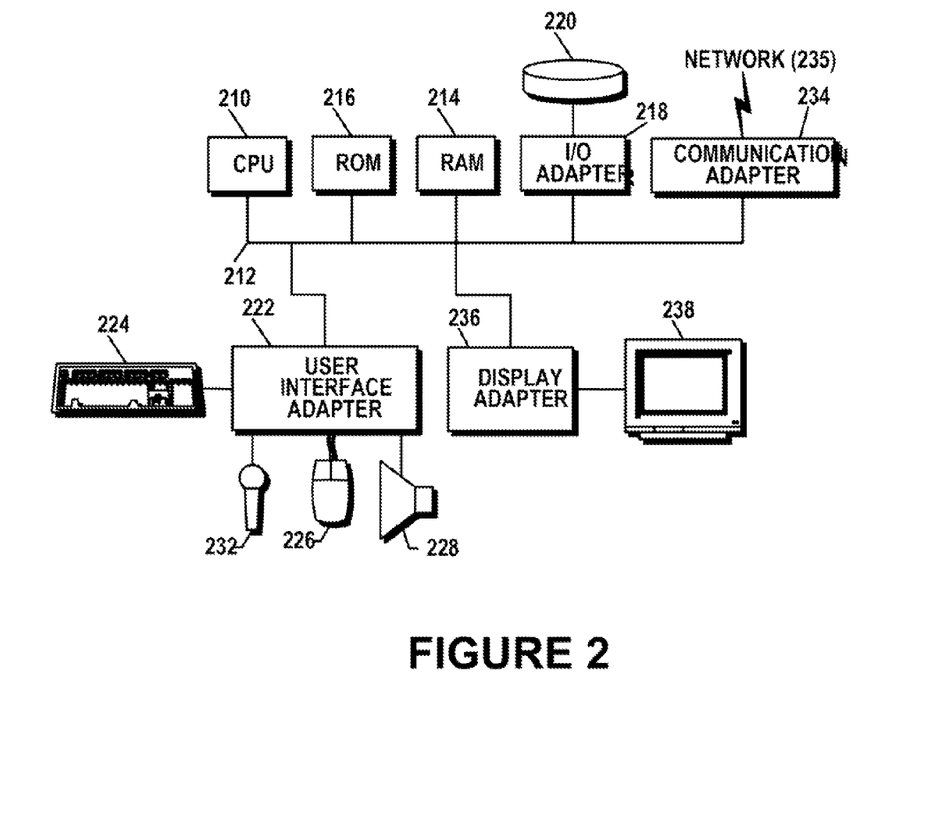
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
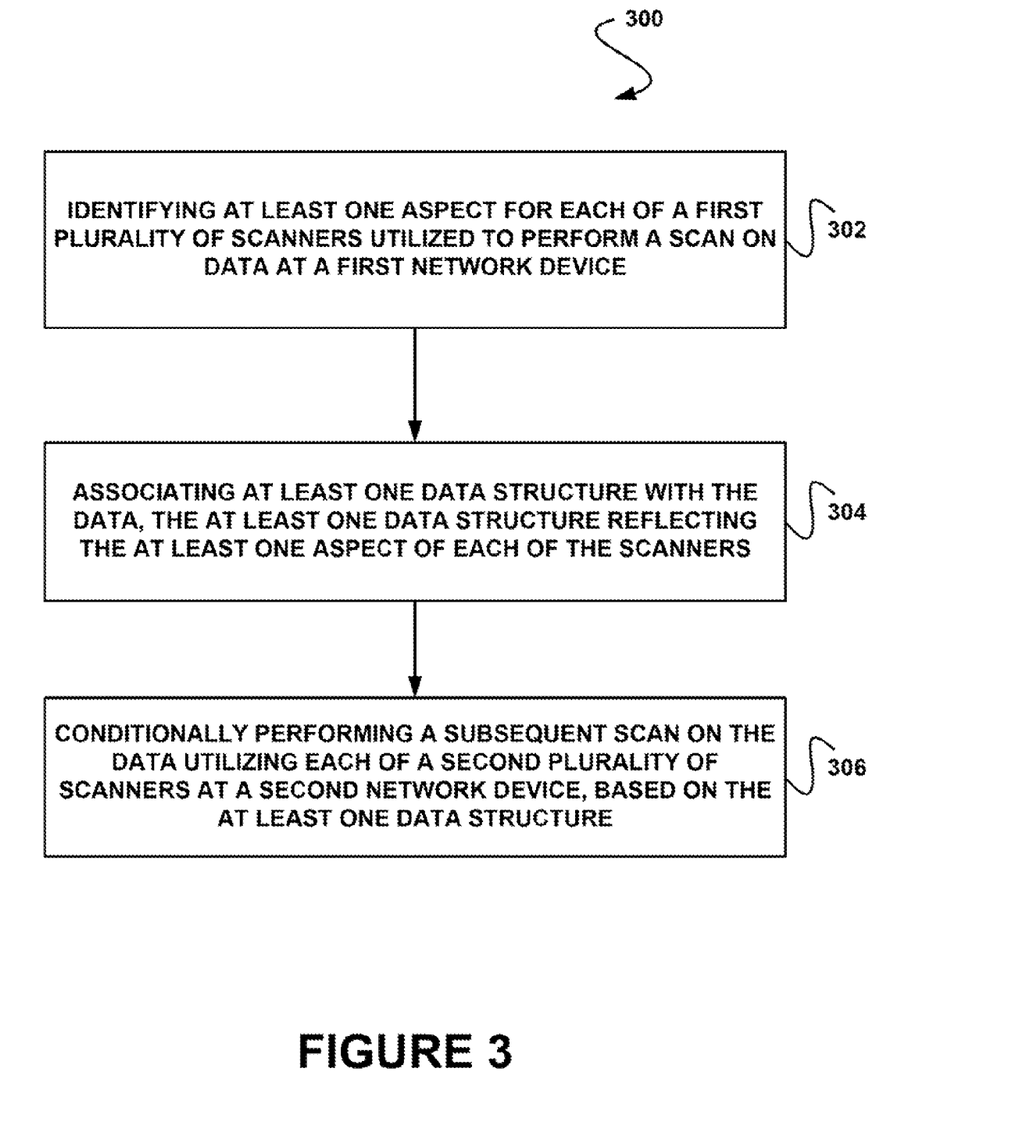
FIG. 3 shows a method for conditionally performing a scan of data based on at least one associated data structure, in accordance with one embodiment.

FIG. 3 shows a method 300 for conditionally performing a scan of data based on at least one associated data structure, in accordance with one embodiment. As an option, the method 300 may be carried out in the context of the architecture and environment of FIG. 1 and/or 2. Of course, however, the method 300 may be carried out in any desired environment.

As shown in operation 302, at least one aspect is identified for each of a first plurality of scanners utilized to perform a scan on data at a first network device. The aspect may include any aspect capable of being associated with the scanners. For example, the aspect may include a setting of the scanners, an action performed on the data by the scanners, a condition to be met by the scanners, etc.

Additionally, the scanners may include any module, application, program, etc. capable of performing a scan on the data. For example, the scanners may include an antivirus scanner, an anti-spam scanner, a mail size filtering scanner, a file filtering scanner, a corrupt content scanner, etc. Further, the scan performed may be any type of scan capable of being performed on data. For example, the scan may be a virus scan, a spam scan, a keyword scan, etc. In this way, the scanners may be utilized for identifying unwanted data (e.g. malware, viruses, spam, predefined content, etc.) based on the scan of the data. Moreover, the scanners may be installed on the first network device, as an option, for performing the scan at the first network device.

Further, in the context of the present description, the data may be any data capable of being scanned at the first network device. In one embodiment, the data may be scanned at the first network device in response to the data being communicated over a network (e.g. such as any of the networks described above with respect to FIG. 1, etc.) to the first network device. For example, the data may include an electronic mail message, a file, a web site, a shun message service (SMS) message, etc.

In addition, the first network device may be any type of device on which the data may be scanned. Optionally, the first network device may be coupled to the network for communicating and/or receiving the data via the network. For example, the first network device may include a client, a mail server, a gateway, and/or any of the devices described above with respect to FIG. 1 and/or 2.

Further, as shown in operation 304, at least one data structure is associated with the data, where the at least one data structure reflects the at least one aspect of each of the first plurality of scanners. In the context of the present description, the data structure may include any type of structure capable of reflecting (e.g. indicating, identifying, etc.) the aspect of each of the scanners. For example, the data structure may include a hash, a string, an array, etc.

In one embodiment, a single data structure may reflect the aspect of each of the scanners. In another embodiment, multiple separate data structures may each reflect an aspect of an associated scanner. To this end, the data structure may optionally include a hash of the aspect associated with one of the scanners, may store a hash for each aspect associated with each of the scanners, etc.

Additionally, the data structure may be associated with the data in any manner. In one embodiment, the data structure may accompany the data. For example, the data structure (e.g. hash, etc.) may be inserted into the data. In another example, the data structure may be inserted into a header or body of the data. In yet another embodiment, the data structure may be linked to the data.

In addition, as shown in operation 306, a subsequent scan on the data is conditionally performed utilizing each of a second plurality of scanners at a second network device, based on the at least one data structure. The subsequent scan may include any scan capable of being performed at the second network device after the scan of the data at the first network device. It should be noted that such second network device may include any device at which the data may be scanned, including, for example, any of the devices described above with respect to FIG. 1 and/or 2. Further, the second network device may be in communication with the first network device via the network, for optionally receiving the data from the first network device.

In one embodiment, the subsequent scan may be performed based on a comparison of the data structure with a second data structure that reflects at least one aspect for each of the second plurality of scanners utilized for scanning at the second network device. Thus, it may be determined whether aspects of the scanners utilized at the first network device match aspect of the scanners utilized at the second network device. In this way, if it is determined that the data structure does not match the second data structure, the subsequent scan may be performed on the data.

In one embodiment, the subsequent scan may be performed utilizing any scanner at the second network device with an aspect that does not match an aspect of any of the scanners at the first network device. To this end, scanners utilized at different network devices, but with the same aspects, may be prevented from performing duplicate scans on the data.

In one exemplary embodiment, the subsequent scan may not be performed utilizing a first scanner at the second network device if an aspect of such scanner matches an aspect of a first scanner at the first network device previously utilized to scan the data. In another exemplary embodiment, the subsequent scan may be performed utilizing a second scanner at the second network device if an aspect of such scanner does not match an aspect of a second scanner at the first network device previously utilized to scan the data.

For example, if the settings and version of one of the scanners at the first network device match the settings and version of one of the scanners at the second network device, the scanner at the second network device may be prevented from performing a subsequent scan of the data. As a result, repetitive scanning may be avoided, thereby saving scanning resources.

Furthermore, in one embodiment, the identification of the aspect for the scanner (operation 302), the association of the data structure with the data (operation 304), and the conditional performance of the subsequent scan (operation 306) may be performed at a mail server. In another embodiment, such operations may be performed at a gateway. In still another embodiment, the operations may be performed at a client.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
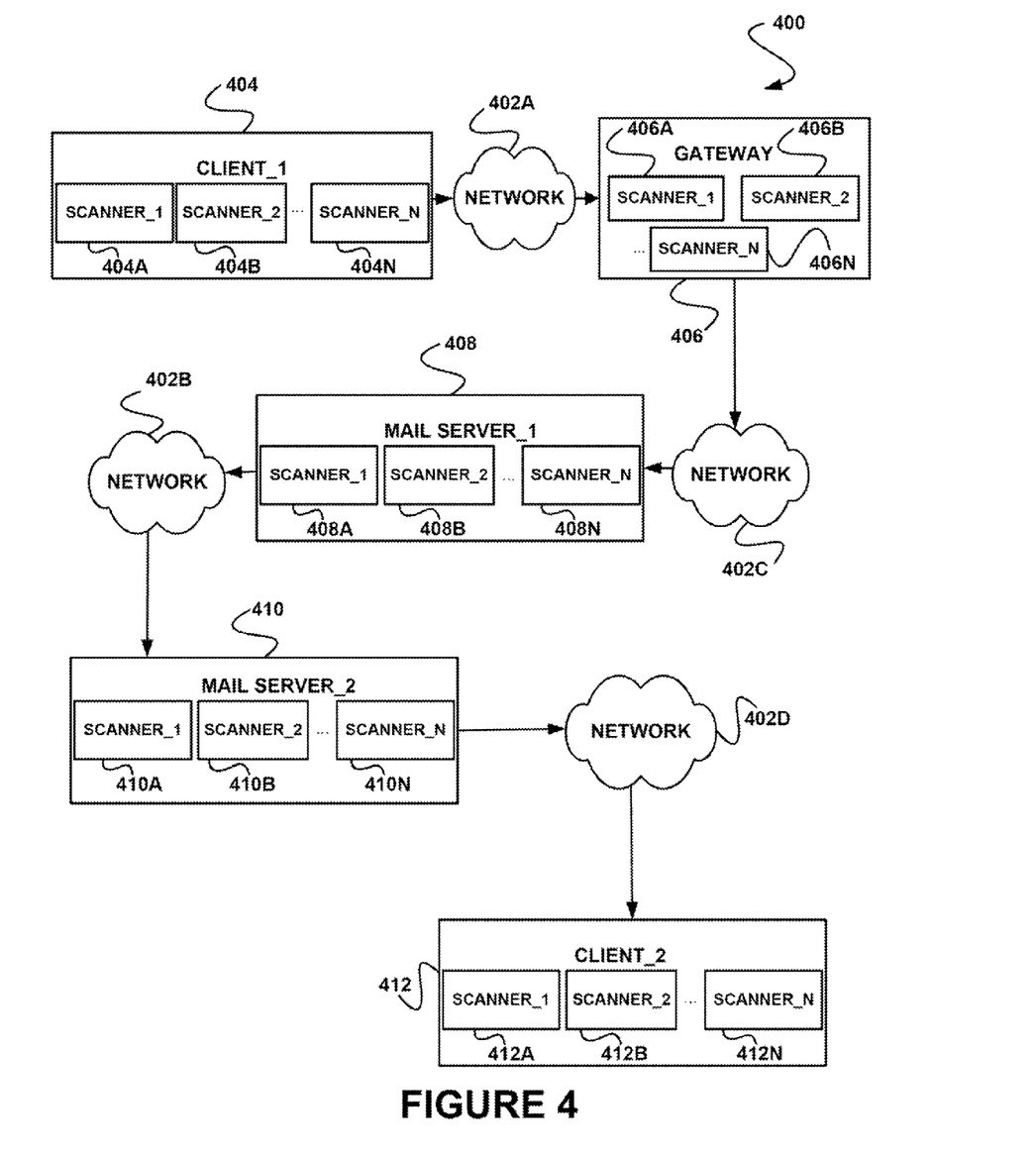
FIG. 4 shows a system including multiple clients, mail servers, and a gateway in which a scan of data is conditionally performed based on at least one associated data structure, in accordance with another embodiment.

FIG. 4 shows a system 400 including multiple clients, mail servers, and a gateway in which a scan of data is conditionally performed based on at least one associated data structure, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a first client 404 is in communication with a gateway 406 via a first network 402A. It should be noted that with respect to the present embodiment, networks 402A-D may each include a single network, as shown, but, of course, may also include any combination of networks. Thus, the first network 402A may include any number of networks capable of allowing the first client 404 and the gateway 406 to communicate. The first client 404 may be any device capable of communicating to the gateway 406 via the first network 402A. For example, the first client 404 may be a mail client. As an option, the first client 404 may include any of the devices described above in the context of FIG. 1 and/or 2.

As also shown, the first client 404 includes first client scanners 404A-N. For example, the scanners may include a virus scanner, an anti-spam scanner, a content scanner, etc. Additionally, in one embodiment, the first client scanners 404A-N may scan data originating at the first client 404. For example, a virus scanner and an anti-spam scanner may scan outgoing electronic mail messages from the first client 404. Of course, the first client scanners 404A-N may also scan data received by the first client 404 (e.g. over the first network 402A, etc.).

In another embodiment, the first client 404 may identify an aspect for each of the first client scanners 404A-N and associate a data structure reflecting such aspects with any data scanned utilizing the first client scanners 404A-N. For example, the first client 404 may identify scan settings of each of first client scanners 404A-N, hash each of the scan settings, and stamp data which has been scanned by the first client scanners 404A-N with the hashes (e.g. by inserting the hashes, an array of the hashes, etc. in the data, by attaching the hashes to the data, etc.).

In addition, the gateway 406 may be any gateway capable of communicating with one or more clients and servers via one or more networks. For example, the gateway 406 may direct data sent from the first network 402A to an intended destination. As an option, the gateway 406 may include the gateway 108 described above in the context of FIG. 1. Furthermore, the gateway 406 includes gateway scanners 406A-N. For example, the gateway scanners 406A-N may include a virus scanner, an anti-spam scanner, a content scanner, etc.

In one embodiment, the gateway scanners 406A-N may be capable of scanning data received from the first client 404. For example, the gateway 406 may identify the data structure associated with the received data, and may compare the data structure to a data structure reflecting any aspects of the gateway scanners 406A-N. If the data structures match, the gateway scanners 406A-N may be prevented from scanning the data. If, however, the data structures do not match, the data may be scanned. For example, the data may be scanned utilizing any gateway scanner 406A-N for which an aspect thereof did not match an aspect of one of the first client scanners 404A-N.

Further, the gateway 406 is in communication with a first mail server 408 via a second network 402B. The first mail server 408 may be any mail server capable of sending or receiving electronic mail messages. As an option, the first mail server 408 may include any of the servers 104 described above in the context of FIG. 1. In addition, the first mail server 408 includes first mail server scanners 408A-N. For example, the first mail server scanners 408A-N may include a virus scanner, an anti-spam scanner, a content scanner, etc. In one embodiment, the first mail server scanners 408A-N may scan data received from the gateway 406. As similarly described above with respect to the gateway 406, the first mail server scanners 408A-N may conditionally scan received data based on a data structure associated with such received data.

Further still, the first mail server 408 is in communication with a second mail server 410 via a third network 402C. The second mail server 410 may be any mail server capable of sending or receiving electronic mail messages (e.g. such as any of the servers 104 described above in the context of FIG. 1). In addition, the second mail server 410 includes second mail server scanners 410A-N. For example, the second mail server scanners 410A-N may include a virus scanner, an anti-spam scanner, a content scanner, etc. In one embodiment, the second mail server scanners 410A-N may scan data received from the first mail server 408, based on a data structure associated with such data, as described above.

Additionally, the second mail server 410 is in communication with a second client 412 via a fourth network 402D. The second client 412 may be any client capable of communicating with the second mail server 410 via the fourth network 402D. For example, the second client 412 may be a mail client. As an option, the second client 412 may include any of the devices described above in the context of FIG. 1.

As also shown, the second client 412 includes second client scanners 412A-N. For example, the second client scanners 412A-N may include a virus scanner, an anti-spam scanner, a content scanner, etc. In one embodiment, the second client scanners 412A-N may scan data received from the second mail server 410, based on a data structure associated with such data, as described above.

Optionally, in one embodiment, one or more of the scanners 404A-N, 406A-N, 408A-N, 410A-N, and 412A-N may be capable of performing the same actions. In another embodiment, one or more of the scanners 404A-N, 406A-N, 408A-N, 410A-N, and 412A-N may have the same settings.

Figure 5:
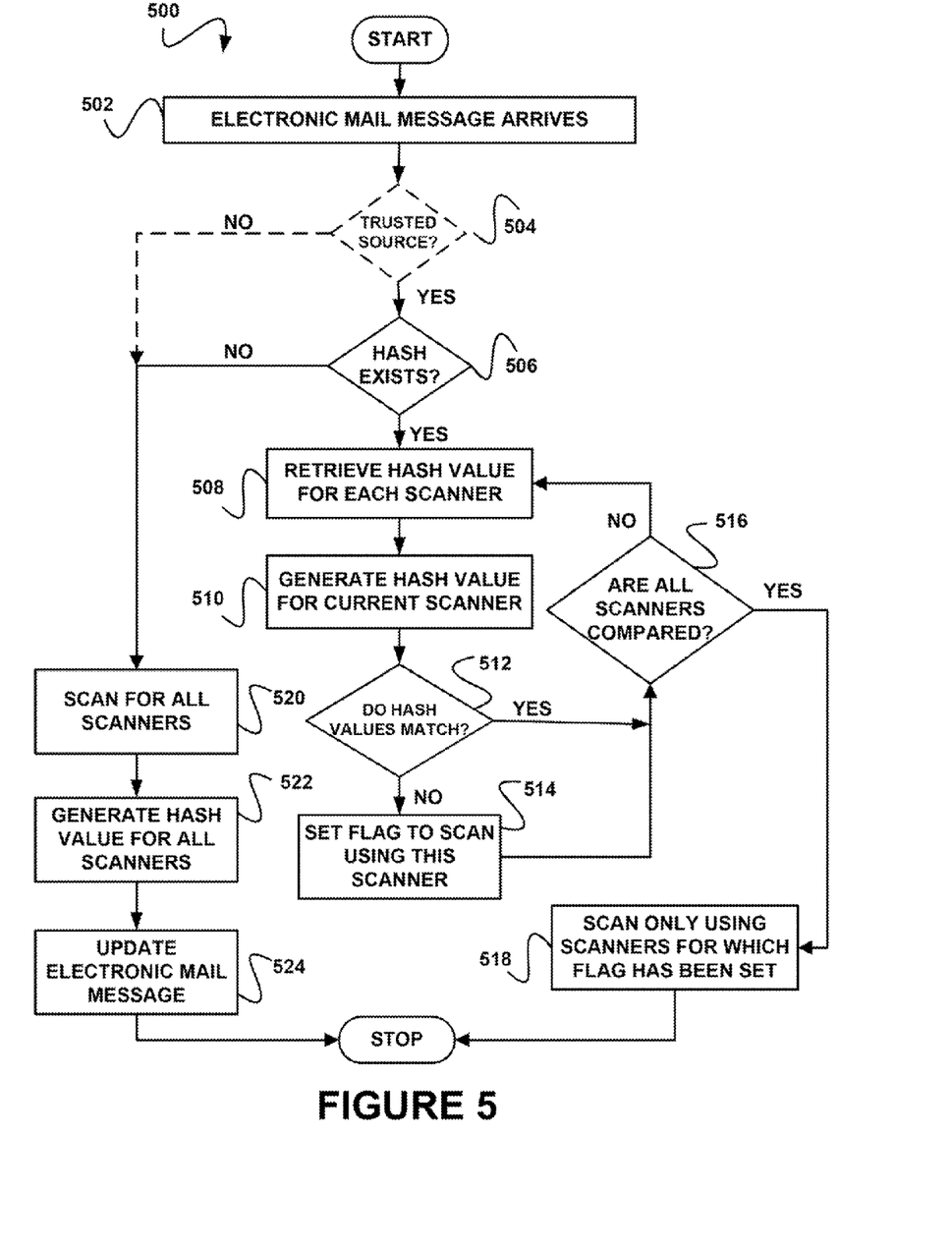
FIG. 5 shows a method for comparing scanners, in accordance with yet another embodiment.

FIG. 5 shows a method 500 for comparing scanners, in accordance with yet another embodiment. As an option, the method 500 may be carried out in the context of the architecture and environment of FIGS. 1-4. Of course, however, the method 500 may be carried out in any desired environment. Again, it should be noted that the aforementioned definitions may apply during the present description.

As shown in operation 502, an electronic mail message arrives at a network device. In one embodiment, the network device may include a server, a client, a gateway, or any other device capable of receiving an electronic mail message. For example, the network device may include a mail server, a mail client at which the electronic mail message originates, as mail client to which the electronic mail message is destined, etc.

In another embodiment, the electronic mail message may arrive via a network. In yet another embodiment, the electronic mail message may be associated with at least one data structure. For example, the electronic mail message may be stamped with a hash before its arrival.

Additionally, it is optionally determined whether the electronic mail message is from a trusted source. See optional decision 504. For example, the origination source of the electronic mail message may be compared against a whitelist of allowable origination sources. In one embodiment, this determination may only be performed if the network device is a gateway.

If in decision 504 it is determined that the electronic mail message is not from a trusted source, then in operation 520 all scanners of the network device scan the electronic mail message. The scanning may include virus scanning, spam scanning, specific content scanning, etc. Thus, the electronic mail message maybe scanned for unwanted data. Additionally, in operation 522, a hash value is generated for all of the scanners of the network device. For example, a separate hash value may be generated for each of the scanners of the network device. Such hash value may be any value generated as a result of performing a hash on one or more aspects of the scanners.

For example, the hash value may be the result of hashing settings of a scanner. In another example, the hash value may be the result of hashing actions performed by a scanner. In yet another example, the hash value may be the result of hashing a version of a scanner.

Further, in operation 524, the electronic mail message is updated. In one embodiment, the hash values generated for all the scanners may be attached to the electronic mail message. For example, the electronic mail message may be stamped with the hash values for all the scanners.

However, if in decision 504 it is determined that the electronic mail message is from a trusted source, in decision 506 it is determined whether one or more hashes exist for the electronic mail message. In the context of the present embodiment, the hashes may each reflect at least one aspect of different scanners previously utilized to scan the electronic mail message at another network device. In one embodiment, the hashes may be attached to the electronic mail message. In another embodiment, the hashes may be in the subject or body of the electronic mail message. In yet another embodiment, the hashes may be generated in response to a prior scanning of the electronic mail message at another network device.

If in decision 506 it is determined that one or more hashes do not exist for the electronic mail message, then in operation 520 all scanners of the network device scan the electronic mail message, in operation 522 a hash value is generated for each of the scanners, and in operation 524 the electronic mail message is updated. If in decision 506 it is determined that one or more hashes exist for the electronic mail message, then in operation 508 hash values are retrieved for each scanner previously utilized to scan the electronic mail message at the other network device.

In one embodiment, hash values for the scanners that have previously scanned the electronic mail message may be retrieved for comparison with hashes for scanners of the network device at which the mail message arrived (in operation 502), as will be described in more detail below. For example, hash values for all virus scanners that have performed prior virus scans on the electronic mail message may be retrieved for comparison with a hash of a virus scanner at the network device which has received the electronic mail message.

In addition, in operation 510, a hash value for a scanner of the network device is generated. In one embodiment, the hash value may be generated by being retrieved from a database, from an associated scanner, etc. In another embodiment, actions and/or settings of the scanner may be hashed for generating the hash value for the scanner. Further, in decision 512 it is determined whether any of the hash values retrieved from the electronic mail message matches the generated hash value. In one embodiment, the match may be determined by comparing the hash values.

In another embodiment, it may be determined whether the hash values of a particular scanner that has performed a prior scan on the electronic mail message at the other network device matches the hash value of the same scanner at the network device that received the electronic mail message. For example, a hash of the actions previously performed by an anti-spam scanner at the other network device may be compared against the actions that are capable of being performed by the anti-spam scanner of the network device that received the electronic mail message.

In another example, a hash of the settings of a previous virus scanner at the other network device may be compared against the settings of a virus scanner at the network device that received the electronic mail message. In this way, it may be determined whether a scan that is performed by a scanner of the network device that received the electronic mail message has already been performed by a similar scanner of another network device.

If it is determined in decision 512 that one or more of the hash values retrieved from the electronic mail message do not match the generated hash value, then in operation 514 a flag is set for indicating a scan using the associated scanner of the network device is to be performed. In one embodiment, a scan database for the scanners of the network device may be updated. In another embodiment, an entry in a hash database for the scanner may be flagged.

In still another embodiment, the scanner itself may be flagged. For example, if the hash of actions performed by a previous virus scanner does not match the actions to be performed by a virus scanner of the network device, the virus scanner of the network device may be flagged. Of course, however, setting the flag may occur in any manner.

Additionally, in decision 516, it is determined whether all scanners of the network device have been compared. For example, such comparison may include the comparison of the hashes associated with scanners of the other network device with hashes associated with scanners of the network device that received the electronic mail message. If all the scanners of the network device have not been compared, then in operation 508 hash values are again retrieved from the electronic mail message, and a hash value for a next scanner of the network device that received the electronic mail message is generated (operation 510). In this way, the hash of each scanner of the network device may be compared against hashes of similar scanners that have previously scanned the electronic, mail message at another network device.

In decision 516, it is determined that all scanners of the network device have been compared, then in operation 518 scanning is performed using only the scanners for which the flag has been set. For example, if the virus scanner of the network device is flagged and the anti-spam scanner of the network device is not flagged, then only the virus scanner will perform a scan on the electronic mail message at the network device. In this way, scanning time and resources may be saved on a scanner-by-scanner basis.

Figure 6:
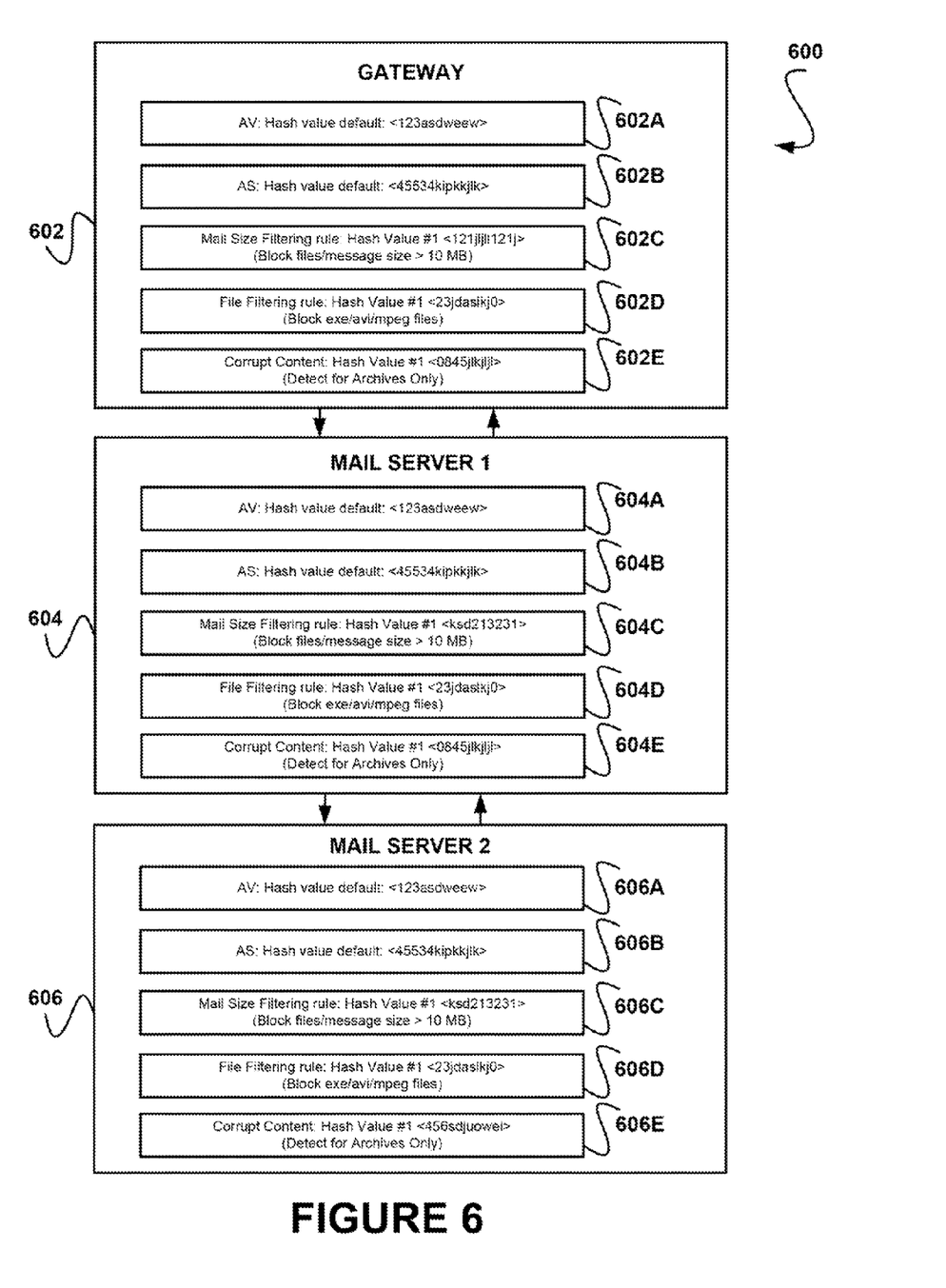
FIG. 6 shows a system in which a plurality of devices are in communication, each device including settings of multiple scanners, in accordance with still yet another embodiment.

FIG. 6 shows a system 600 in which a plurality of devices are in communication, each device including settings of multiple scanners, in accordance with still yet another embodiment. As an option, the system 600 may be implemented in the context of the architecture and environment of FIGS. 1-5. Of course, however, the system 600 may be implemented in any desired environment. Again, it should be noted that the aforementioned definitions may apply during the present description.

As shown, a gateway 602 is in communication with a first mail server 604. Further, the first mail server 604 is in communication with a second mail server 606. Additionally, the gateway 602 includes gateway scanners 602A-E, the first mail server 604 includes first mail server scanners 604A-E, and the second mail server 606 includes second mail server scanners 606A-E. Further, each setting of the scanners includes a hash value for the scanner. For example, gateway scanner 602A is an anti-virus (AV) scanner with a hash value of "123asdweew." In the context of the present embodiment, the hash value may represent an aspect of the associated scanner.

In one embodiment, data may be sent from the gateway 602 to the first mail server 604, and further from the first mail server 604 to the second mail server 606. For example, the gateway 602 may send an electronic mail message to the first mail server 604 via a network, and the first mail server 604 may send the electronic mail message to the second mail server 606 via the same or different network. In addition, the gateway 602 may first scan the data with each of the gateway scanners 602A-E prior to sending the electronic mail message to the first mail server 604. For example, the electronic, mail message may be scanned by the anti-virus scanner 602A, an anti-spam scanner 602B, a filter utilizing a mail size filtering rule 602C, the filter utilizing the file filtering rule 602D, and a corrupt content scanner 602E.

Further, in another embodiment, the hash values for the gateway scanners 602A-E may be associated with the data sent from the gateway 602 to the first mail server 604. For example, the gateway 602 may stamp the electronic mail message with the hashes for each of gateway scanners 602A-E that scanned the electronic mail message. In another embodiment, when the first mail server 604 receives data from the gateway 602, the hash values for the gateway scanners 602A-E that scanned the data may be compared to the hash values for the first mail server scanners 604A-E at the first mail server 604. For example, the first mail server 604 may compare the hash values for the gateway scanners 602A-E that were stamped onto the electronic mail message with the hash values for the first mail server scanners 604A-E.

Additionally, in still another embodiment, only the first mail server scanners 604A-E whose hash values differ from the hashes of the gateway scanners 602A-E may scan the electronic mail message. For example, the hash value of the filter that utilizes the mail size filtering rule 602C at the gateway 602 may not match the hash value of the filter that utilizes the mail size filtering rule 604C at the first mail server 604. Therefore, the mail size filtering rule 604C at the first mail server 604 may be flagged, and such mail size filtering rule 604C may be utilized to perform a scan on the received electronic mail message. In addition, since first mail server scanners 604A, 604B, 604D, and 604E have hash values that match the hash values of the gateway scanners 602A-E, the first mail server scanners 604A, 604B, 604D, and 604E may not perform a scan on the received electronic mail message. Further, if the hash values for all the first mail server scanners 604A-E match the hash values for the gateway scanners 602A-E, then the electronic mail message may not be scanned.

In another embodiment, the first mail server 604 may associate an electronic mail message sent to the second mail server 606 with the hash values of the first mail server scanners 604A-E that scanned the electronic mail message. When the electronic mail message arrives at the second mail server 606, the second mail server 606 may compare the associated hash values with the hash values of second mail server scanners 606A-E. In another embodiment, only the second mail server scanners 606A-E whose hash values do not match the hash values associated with the electronic mail message may perform scanning on the electronic mail message.

In one example, only the corrupt content scanner 606E of the second mail server 606 may have a hash value different from a hash value of a scanner that previously scanned the electronic mail message (e.g. the corrupt content scanner 604E of the first mail server 604). Therefore, only the corrupt content scanner 606E of the second mail server 606 may perform a scan on the electronic mail message sent from the first mail server 604 to the second mail server 606. In this way, scans already performed on the data using certain settings may optionally not be repeated by a later scanner with the same settings, resulting in a performance synergy. In addition, complete data hygiene (e.g. the prevention of unwanted data) may be ensured by not allowing a threat to leak into an organization, which may disrupt one or more networks of the organization, or even out of the organization, which may further lead to legal ramifications.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving first data from a first network device configured to utilize a first plurality of scanners to perform a first scan;
identifying a first data structure associated with the first data;
comparing the first data structure to a second data structure reflecting an aspect of a second plurality of scanners, wherein a determination is made whether hash values associated with the first plurality of scanners and the second plurality of scanners have been compared; and
preventing the second plurality of scanners from performing a subsequent scan of the first data based on whether the first data structure matches the second data structure.

2. The method of claim 1, wherein the first data is sent by a mail server and received at a gateway.

3. The method of claim 1, wherein the second plurality of scanners are part of a group of scanners, the group consisting of:
a) an antivirus scanner;
b) an anti-spam scanner;
c) a mail size filtering scanner;
d) a file filtering scanner; and
e) a corrupt content scanner.

4. The method of claim 1, wherein the second plurality of scanners are configured for identifying unwanted data.

5. The method of claim 1, wherein the data structure reflects an aspect for each of the second plurality of scanners, the data structure being included in a group of data structures, the group consisting of:
a) a hash;
b) a string; and
c) an array.

6. The method of claim 1, wherein the second plurality of scanners scan the first data if the first data structure does not match the second data structure.

7. The method of claim 1, wherein settings and versions of the first plurality of scanners and the second plurality of scanners are compared in order to determine whether to perform the subsequent scan.

8. The method of claim 1, further comprising:
determining whether one or more hashes exist for an electronic mail message;
retrieving particular hashes for at least one scanner previously utilized for scanning the electronic mail message at the first network device; and determining not to subsequently scan the electronic mail message.

9. Logic encoded in non-transitory media that includes code for execution and when executed by a processor operable to perform operations, comprising:
   receiving first data from a first network device configured to utilize a first plurality of scanners to perform a first scan;
   identifying a first data structure associated with the first data;
   comparing the first data structure to a second data structure reflecting an aspect of a second plurality of scanners, wherein a determination is made whether hash values associated with the first plurality of scanners and the second plurality of scanners have been compared; and
   preventing the second plurality of scanners from performing a subsequent scan of the first data based on whether the first data structure matches the second data structure.

10. The logic of claim 9, wherein the first data is sent by a mail server and received at a gateway.

11. The logic of claim 9, wherein the second plurality of scanners are part of a group of scanners, the group consisting of:
   a) an antivirus scanner;
   b) an anti-spam scanner;
   c) a mail size filtering scanner;
   d) a file filtering scanner; and
   e) a corrupt content scanner.

12. The logic of claim 9, wherein the second plurality of scanners are configured for identifying unwanted data.

13. The logic of claim 9, wherein the data structure reflects an aspect for each of the second plurality of scanners, the data structure being included in a group of data structures, the group consisting of:
   a) a hash;
   b) a string; and
   c) an array.

14. The logic of claim 9, wherein the second plurality of scanners scan the first data if the first data structure does not match the second data structure.

15. The logic of claim 9, wherein settings and versions of the first plurality of scanners and the second plurality of scanners are compared in order to determine whether to perform the subsequent scan.

16. The logic of claim 9, the operations further comprising:
   determining whether one or more hashes exist for an electronic mail message;
   retrieving particular hashes for at least one scanner previously utilized for scanning the electronic mail message at the first network device; and
   determining not to subsequently scan the electronic mail message.

17. An apparatus, comprising:
   a processor coupled to a memory, wherein the apparatus is configured for:
      receiving first data from a first network device configured to utilize a first plurality of scanners to perform a first scan;
      identifying a first data structure associated with the first data;
      comparing the first data structure to a second data structure reflecting an aspect of a second plurality of scanners, wherein a determination is made whether hash values associated with the first plurality of scanners and the second plurality of scanners have been compared; and
      preventing the second plurality of scanners from performing a subsequent scan of the first data based on whether the first data structure matches the second data structure.

18. The apparatus of claim 17, wherein the second plurality of scanners are configured for identifying unwanted data.

19. The apparatus of claim 17, wherein settings and versions of the first plurality of scanners and the second plurality of scanners are compared in order to determine whether to perform the subsequent scan.

20. The apparatus of claim 17, the apparatus further configured for:
   determining whether one or more hashes exist for an electronic mail message;
   retrieving particular hashes for at least one scanner previously utilized for scanning the electronic mail message at the first network device; and
   determining not to subsequently scan the electronic mail message.

* * * * *